May 27, 1930.  C. A. HERRMANN  1,760,696
BOAT
Filed Feb. 11, 1928  2 Sheets-Sheet 1
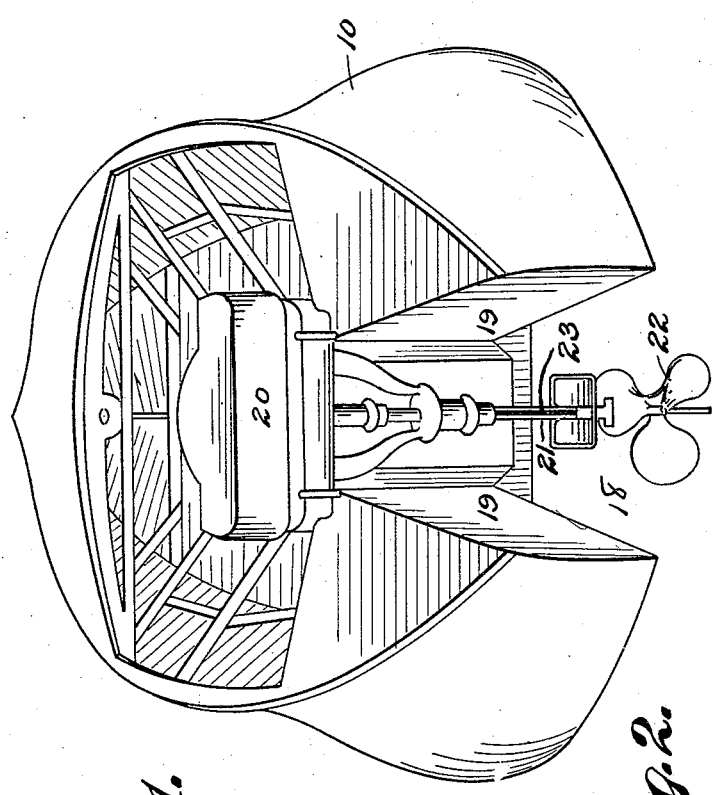
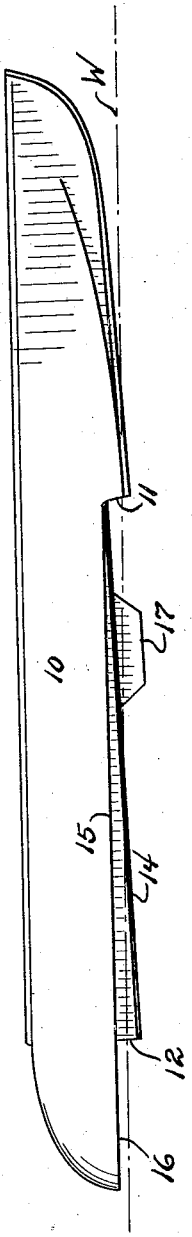
Charles A. Herrmann
INVENTOR
BY Victor J. Evans
ATTORNEY
WITNESS:

May 27, 1930. C. A. HERRMANN 1,760,696
BOAT
Filed Feb. 11, 1928 2 Sheets-Sheet 2
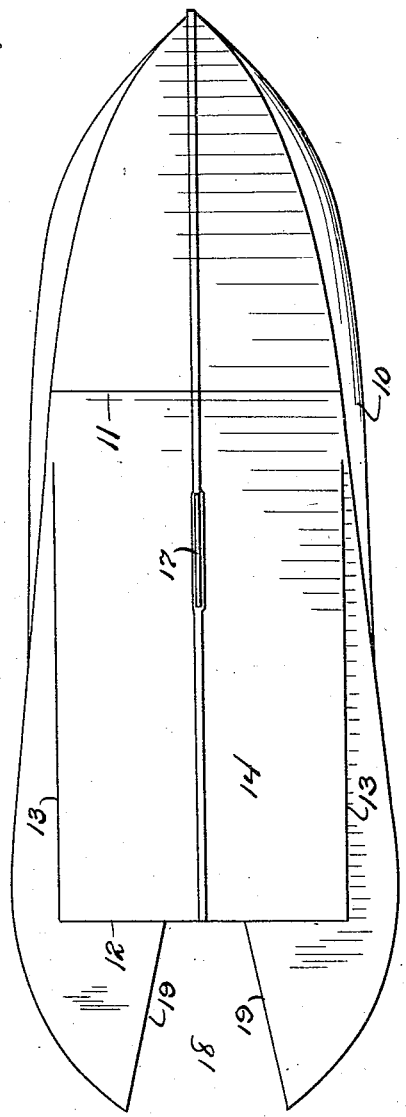
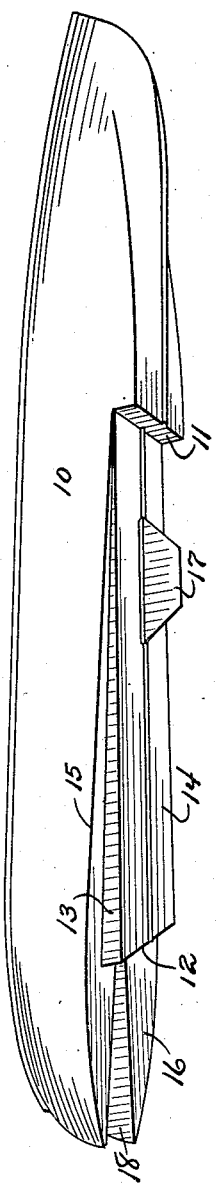
Charles A. Herrmann
INVENTOR
BY Victor J. Evans
ATTORNEY
WITNESS:

Patented May 27, 1930

1,760,696

UNITED STATES PATENT OFFICE

CHARLES A. HERRMANN, OF PENN YAN, NEW YORK

BOAT

Application filed February 11, 1928. Serial No. 253,717.

This invention relates to improvements in boats, especially designed for high speed, an object of the invention being to provide a boat hull having a relatively narrow planing bottom and an extended beam upon each side of the planing bottom with the beam normally disposed above the high speed water line of the boat, so as to provide a running bottom of narrow beam, and a free overhanging side beam, and thus insure both speed and stability. This construction results first, in a boat of high speed, second, a boat that is practically non-capsizable, and third, the reduction of pounding and jumping in rough water to a minimum.

Another object of the invention is the provision of a boat having a running bottom and an overhanging section which is normally disposed above the high speed water line and which is extended an appreciable distance rearward beyond the position of the engine, the invention being especially designed for outboard motors. This limits the amount of "kick up" usually experienced in starting, and permits the driver to remain in the extreme stern of the boat and give the most powerful engine instant full throttle without danger. This is a tremendous advantage in racing.

With the above and other objects in view, the invention further includes the following novel features and details of construction, to be hereinafter more fully described, illustrated in the accompanying drawings and pointed out in the appended claims.

In the drawings:—

Figure 1 is a perspective view looking at the stern of a boat constructed in accordance with the invention.

Figure 2 is a side view of the same with the engine removed.

Figure 3 is a bottom plan view.

Figure 4 is a perspective view.

Referring to the drawings in detail wherein like characters of reference denote corresponding parts, the reference character 10 indicates the hull of the boat whose bottom is provided with a transverse step 11 and a transverse step 12. These steps are spaced an appreciable distance apart, the step 11 being located in advance of the central point of the midship section of the boat while the step 12 is located an appreciable distance aft of this section. The bottom is also provided with longitudinally disposed spaced steps 13 which extend from the step 11 to the step 12 and which gradually increase in depth from the former to the latter step. This provides a planing bottom 14 which extends downwardly from the bottom 15 of the hull and provides a relatively narrow high speed running bottom and a laterally extending overhanging bottom upon each side of the planing bottom, the overhanging bottom being normally disposed above the high speed water line of the boat which is indicated at W in Figure 2 of the drawings. The bottom 15 extends an appreciable distance aft beyond the stern end of the planing bottom, or beyond the step 12, as shown at 16, so that in addition to the laterally extending overhanging bottom which provides lateral stability for the boat, the stern overhanging section 16 limits the amount of forward "kick up" of the boat. In addition, the overhanging portions of the bottom reduce to a minimum pounding and jumping of the boat in rough water. Extending downwardly from the planing bottom and disposed longitudinally thereof is a relatively short fin 17. The boat is designed for class B motors where power developed is sufficient to make in excess of twenty-eight miles per hour, and is especially designed for outboard motors. One of the novel features of the invention is the provision of means for locating the outboard motor an appreciable distance from the extreme stern of the hull. For this purpose, the stern section is bifurcated as shown at 18, the bifurcation extending inward approximately to the rear transverse step 12. The opposite walls 19 of the bifurcated portion 18 incline rearwardly and outwardly and the engine 20 is secured at the inner end of the bifurcation with a propeller shaft 21, extending downward, so that the propeller 22 and the rudder 23 are both located at the inner end of the bifurcation, or, at the stern end of the planing bottom 14. Any tendency of the bow of the boat to kick up when starting will be resisted by the overhanging portion 16 of the stern hich is aft of the propeller, so that the most powerful engine may have its throttle opened instantly to its full extent without danger of the boat kicking over, even though the driver remains in the extreme stern of the load. This is an obvious advantage in a race in that it results in a quick get away, while ordinarily, drivers must move forward to "break their boats over" which results in considerable loss of time. Further, by means of the formation of the boat bottom and the location of the propeller, the boat may be turned substantially at right angles, an obvious advantage in a race.

It will be apparent from the foregoing description and accompanying drawings that the invention provides a boat which combines speed, stability and seaworthiness, an unusual combination in a racing boat, this combination being obtained by the construction and formation of the bottom of the hull, which provides a relatively narrow running or planing bottom and normally elevated overhanging beam and stern.

The invention is susceptible of various changes in its form, proportions and minor details of construction and the right is herein reserved to make such changes as properly fall within the scope of the appended claims.

Having described the invention what is claimed is:—

1. In a boat hull, an interrupted planing bottom of less length and beam than the length and beam of the hull and extending from a point forward of the central midship section rearwardly an appreciable distance beyond said midship section to within a short distance of and terminating short of the extreme stern of the hull.

2. In a boat hull, a planing bottom of less length and beam than the length and beam of the hull, and the bottom of the hull extending rearwardly beyond the stern of the planing bottom and being on the same horizontal plane as and forming a continuation of the hull bottom upon opposite sides of the planing bottom.

3. In a boat hull, a planing bottom of less width than the beam of the hull and a relatively short downwardly extending fin positioned amidships and disposed longitudinally of the planing bottom near the forward end of the latter.

4. In a boat hull, a planing bottom of less beam than the beam of the hull and terminating short of the extreme stern of the hull and having a bifurcated stern section extending from said extreme stern inwardly along the longitudinal center of the hull.

5. In a boat hull, a planing bottom of less beam than the beam of the hull and terminating short of the extreme stern of the hull and having a bifurcated stern section extending from said extreme stern inwardly along the longitudinal center of the hull and terminating at the stern end of the planing bottom.

6. In a boat hull, a planing bottom of less beam than the beam of the hull and terminating short of the extreme stern of the hull and having a bifurcated stern section extending from said extreme stern inwardly along the longitudinal center of the hull and terminating at the stern end of the planing bottom and the opposed side walls of the bifurcation inclining relatively rearward and outward.

7. In a boat, a hull having a bottom including a relatively narrow planing section and laterally extending sections upon each side of said planing section, said extended sections being normally disposed above the high speed water line of the boat and providing a centrally located narrow running section and overhanging side stabilizing sections.

In testimony whereof I affix my signature.

CHARLES A. HERRMANN.